United States Patent
Thorpe

(10) Patent No.: US 12,125,029 B2
(45) Date of Patent: Oct. 22, 2024

(54) ROTATIONAL PROBABILISTIC PAYMENT SHARDING IN ELECTRONIC DISTRIBUTION SYSTEMS, METHODS, AND COMPUTER PRODUCTS

(71) Applicant: FORMLESS, INC., Wilmington, DE (US)

(72) Inventor: Brandon Tory Thorpe, Cambridge, MA (US)

(73) Assignee: FORMLESS, INC., Wilmington, DE (US)

( * ) Notice: Subject to any disclaimer, the term of this patent is extended or adjusted under 35 U.S.C. 154(b) by 61 days.

(21) Appl. No.: 17/829,952

(22) Filed: Jun. 1, 2022

(65) Prior Publication Data
US 2023/0394479 A1  Dec. 7, 2023

(51) Int. Cl.
*G06Q 20/38* (2012.01)
*G06Q 20/22* (2012.01)
*G06Q 20/36* (2012.01)

(52) U.S. Cl.
CPC ........... *G06Q 20/389* (2013.01); *G06Q 20/29* (2013.01); *G06Q 20/36* (2013.01)

(58) Field of Classification Search
CPC ....... G06Q 20/389; G06Q 20/29; G06Q 20/36
See application file for complete search history.

(56) References Cited

U.S. PATENT DOCUMENTS

| | | | | |
|---|---|---|---|---|
| 5,222,235 A * | 6/1993 | Hintz | | G06F 16/22 |
| | | | | 703/22 |
| 7,346,545 B2 | 3/2008 | Jones | | |
| 8,117,094 B2 * | 2/2012 | Multerer | | G06Q 40/12 |
| | | | | 705/28 |
| 8,712,825 B1 * | 4/2014 | Holcombe | | G06Q 50/184 |
| | | | | 705/53 |
| 2002/0032651 A1 * | 3/2002 | Embrey | | H04M 15/68 |
| | | | | 705/40 |
| 2009/0260067 A1 | 10/2009 | Racabi | | |
| 2010/0010906 A1 * | 1/2010 | Grecia | | G06Q 40/00 |
| | | | | 705/40 |
| 2010/0010925 A1 | 1/2010 | Wohlstadter | | |
| 2019/0318348 A1 * | 10/2019 | Brenner | | G06Q 50/184 |
| 2020/0210984 A1 | 7/2020 | Ericson et al. | | |

(Continued)

OTHER PUBLICATIONS 7.0 Pointers at http://rc.usf.edu/tutorials/classes 2010, 5 pgs. (Year: 2010).*

(Continued)

*Primary Examiner* — Matthew S Gart
*Assistant Examiner* — William D Newlon
(74) *Attorney, Agent, or Firm* — DENTONS US LLP

(57) ABSTRACT

A method, system, and non-transitory storage medium with instructions that implement a method to receive an electronic payment; select a selected payee's address from an address array, the address array storing a plurality of addresses of different payees in a plurality of locations in the address array, each different payee being entitled to a share of the payment; and transmit the payment in its entirety to the selected payee via the selected payee's address. The payee address selection may include stepping through a linearly populated address array, stepping through a randomly populated address array, or randomly selecting the address in the address array.

14 Claims, 4 Drawing Sheets

(56) References Cited

U.S. PATENT DOCUMENTS

| | | |
|---|---|---|
| 2020/0294038 A1 | 9/2020 | Kreiser et al. |
| 2020/0364709 A1 | 11/2020 | Newman |
| 2021/0224757 A1 | 7/2021 | Carthy et al. |
| 2021/0272222 A1* | 9/2021 | Hatcher ............. G06Q 20/1235 |
| 2022/0043891 A1 | 2/2022 | Ha |
| 2022/0092566 A1 | 3/2022 | Austring et al. |
| 2022/0114565 A1* | 4/2022 | Rotter .................... G06Q 20/29 |
| 2023/0075182 A1* | 3/2023 | Galuten ............... G06Q 20/223 |

OTHER PUBLICATIONS

Yahya Almigdad et al., "Music Royalty Payment Scheme Using Blockchain Technology", 2021 5th International symposium on Multidisplinary Studies & Innovative Technologies, IEEE, pp. 539-545 Oct. 21, 2021.

Wagner, Rob, "Choosing an element from at random from an array with specific probabilities per element", Jun. 28, 2012, pp. 1-7, https://stackoverflow.com/questions/11250154/choosing-an-element-from-at-random-from-an-array-with-specific-probabilities-per/11250234#11250234.

PCT Written Opinion and Search Report issued in connection with related PCT/US2023/021109 dated Aug. 22, 2023.

* cited by examiner

ROTATIONAL PROBABILISTIC PAYMENT SHARDING IN ELECTRONIC DISTRIBUTION SYSTEMS, METHODS, AND COMPUTER PRODUCTS

This disclosure generally relates to electronic payment distribution systems and methods, and more specifically, large-scale royalty distribution and revenue sharing systems and methods for large numbers of payees.

All of the programming code in this patent application is subject to copyright protection under the copyright laws of the United States and of other countries. As of the first effective filing date of the present application, this material is protected as published material, and to the extent not already subject to protection for published material, as unpublished material. However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

BACKGROUND

Mechanical royalties are payments that become due to one or more recipients or payees, typically creators, for use of a work. The work can be, e.g., a song, an audiovisual work, a video, a literary work, artwork, or any other property which can be transacted on the Internet.

Splitting mechanical royalties due from a single transaction among a large number of recipients is expensive because it requires iterating over a list of recipients, and in the case of blockchain-based transactions on a chain like Ethereum®, it requires a significant amount of Ethereum® Virtual Machine (EVM) bytecode. Alternatively, pull-based sharding could work, but requires the receivers of the royalties to make requests for accountings of the transactions and to withdraw their payment shares. For example, if a creator has a large catalog of assets on a blockchain, they need to periodically enumerate these assets, and perform withdrawals in perpetuity.

SUMMARY

The present disclosure provides one or more inventions concerning methods, systems, and computer products for sharding high-volume distributions fairly among a relatively unbounded number of recipients at a low computational workload per transaction, as discussed herein. Preferably, the distributions are mechanical royalties, but can be revenues associated with property on the Internet. Preferably, the recipients are creators of or assignees of rights shared ownership in the properties. Preferably, as transactions settle, the royalties can instantly initiate (i.e., are instantly paid) and be streamed (be pushed) to the electronic wallets of the recipients. Recipients may be people, entities, or other computer systems which may perform additional downstream routing of payment shards.

The sharding scheme embodying principles disclosed herein for high-volume, low-cost streaming, has a special property in scenarios where there is a fixed price per transaction. In these cases it becomes possible to load balance funds transfers by applying a step sharding strategy to the distribution of funds. This means instead of sharding the revenue within a transaction itself, it is possible to split the transactions into streams of whole units and to probabilistically shard these units among recipients over time. That is to say, it is more computationally and power efficient to split a stream of royalties from different transactions into streams of undivided royalties for the recipients or payees than it is to split or divide each royalty among the recipients or payees. To probabilistically shard the units or payments means to distribute or route the units or payments at a determined frequency to each payee, as explained herein Attached as an appendix and fully incorporated herein by reference is a copy of the article: Dr. Gavin Wood, Ethereum: A Secure Decentralised Generalised Transaction Ledger, Berlin Version, d77a378 (Apr. 26, 2022), which details the Ethereum® blockchain system as well as the protocols used by users of the system. This article includes definitions of terms used herein and transaction costs paid to Ethereum®.

The principles disclosed herein are particularly well suited for the distribution and sharding of mechanical royalties for consumption of streamed music, given the generally high number of instances songs are played or streamed over a network such as the Internet. However, the principles have also have applicability in other situations with suitable high-volume repeated consumption of an electronic work, e.g., ebooks or other e-articles, photographs, videos or audiovisual works, to note a few.

As can be appreciated, these methods and systems, are implemented on network systems comprised of interconnected computer processor controlled devices, which execute computer processor executable instructions or code, which instructions or code are stored in non-transitory computer processor readable media. By way of example, and not limitation, such non-transitory computer-readable or processor-readable media may comprise random access memory (RAM), read only memory (ROM) optical disk storage, a solid-state drive (SSD) magnetic disk storage or other magnetic storage devices, or any other tangible storage medium that may be used to store desired program code in the form of instructions or data structures and that may be accessed by a computer or processor.

In an embodiment, there is provided a non-transitory storage medium with computer processor executable instructions stored thereon that when executed by the computer processor cause a computer to:

receive an electronic payment;

select a selected payee's address from an address array, the address array storing a plurality of addresses of different payees in a plurality of locations in the address array, each different payee being entitled to a share of the payment; and transmit the payment in its entirety to the selected payee via the selected payee's address.

In an embodiment of the non-transitory storage medium, the executable instructions, when executed by the computer processor, cause the computer to select the selected payee's address by changing a value in a pointer that points to address storage locations in the address array.

In an embodiment of the non-transitory storage medium, the executable instructions, when executed by the computer processor, cause the computer to select the selected payee's address by incrementing or decrementing the value in the pointer.

In an embodiment of the non-transitory storage medium, the executable instructions, when executed by the computer processor, cause the computer to generate a random distribution of the addresses in the array, such that incrementing the pointer deterministically produces a randomly ordered sequence of payee addresses where each address occurs with a frequency proportional to the share in the creative work.

In an embodiment of the non-transitory storage medium, the addresses in the address array are electronic wallet addresses.

In an embodiment of the non-transitory storage medium, the medium is part of a blockchain.

In an embodiment of the non-transitory storage medium of, a portion of the executable instructions are contained within a smart contract.

In an embodiment of the non-transitory storage medium, the executable instructions, when executed by the computer processor, cause the computer to determine a number of addresses in the address array by taking into account the number of payees divided by the smallest share to which one of the payees is entitled.

In an embodiment of the non-transitory storage medium, the executable instructions, when executed by the computer processor, cause the computer to populate plural address locations in the address array for a payee with a share that is greater than a share of another payee.

In an embodiment, there is a provided a method, comprising:

receiving an electronic payment;

selecting a selected payee's address from an address array, the address array storing a plurality of addresses of different payees in a plurality of locations in the address array, each different payee being entitled to a share of the payment; and transmitting the payment in its entirety to the selected payee via the selected payee's address.

In an embodiment of the method, selecting the selected payee's address comprises setting a value in a pointer, the value indicating from which location in the address array to retrieve the selected payee's address.

In an embodiment of the method, setting the value in the pointer comprises incrementing or decrementing a value already present in the pointer and thus selecting an address adjacent the address indicated by the value already present in the pointer.

In an embodiment of the method, setting the value in the pointer comprises randomly generating the value.

In an embodiment of the method, a random distribution of the addresses is stored on a blockchain.

In an embodiment of the method, determining a number of addresses in the address array by taking into account the number of payees divided by the smallest share to which one of the payees is entitled.

In an embodiment of the method, populating plural address locations in the address array for a payee with a share that is greater than a share of another payee.

In an embodiment of the method, the method comprises linearly populating the address array with addresses.

In an embodiment of the method, the method comprises randomly populating the address array with addresses.

In an embodiment of the method, the method is performed using a smart contract in conjunction with deployment code which prepares the smart contract.

In an embodiment, there is provided a system comprising:

a computer with computer processor, the computer being in communication with a communications network;

memory in communication with the computer processor; and a smart contract stored in the memory, the smart contract comprised of instructions which are executable by the computer processor, the instructions, when executed by the computer processor causing the computer to:

receive an electronic payment from the communications network;

select a selected payee's address from an address array, the address array storing a plurality of addresses of different payees in a plurality of locations in the address array, each different payee being entitled to a share of the payment; and transmit the payment in its entirety to the selected payee via the selected payee's address via the communications network.

In an embodiment of the system, the executable instructions, when executed by the computer processor, cause the computer to select the selected payee's address by changing a value in a pointer that points to address storage locations in the address array.

In an embodiment of the system, the executable instructions, when executed by the computer processor, cause the computer to select the selected payee's address by incrementing or decrementing the value in the pointer.

In an embodiment of the system, the executable instructions, when executed by the computer processor, cause the computer to randomly populate the address array with the addresses of the different payees.

In an embodiment of the system, the executable instructions, when executed by the computer processor, cause the computer to determine a number of addresses in the address array by taking into account the number of payees divided by the smallest share to which one of the payees is entitled.

In an embodiment of the system, the executable instructions, when executed by the computer processor, cause the computer to populate the plural address locations in the address array for a payee with a share that is greater than a share of another payee.

In an embodiment of the system, the executable instructions, when executed by the computer processor, cause the computer to linearly populate the address array with addresses.

In an embodiment of the system, the executable instructions, when executed by the computer processor, cause the computer to randomly populate the address array with addresses.

DETAILED DESCRIPTION

Figure 1:
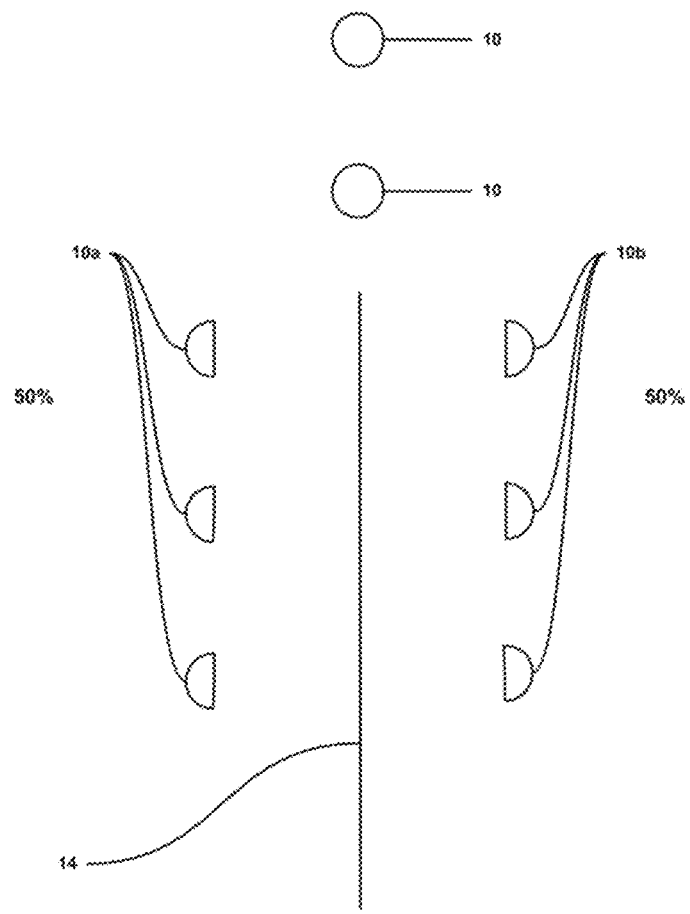
FIG. 1 illustrates a sharding distributions scheme.

The present invention(s) is(are) here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The principles discussed herein are intended to be implemented in a computer network environment, preferably one with a decentralized distribution network (DDN). Below, in connection with FIGS. 3 and 4, a network environment in which the principles described herein can be implemented is described.

Although the terms first, second, etc. can be used herein to describe various elements, components, layers and/or sections, these elements, components, layers and/or sections should not necessarily be limited by such terms. These terms are used to distinguish one element, component, layer or section from another element, component, layer, or section. Thus, a first element, component, layer, or section discussed below could be termed a second element, component, layer, or section without departing from various teachings of this disclosure.

Terminology used herein is for describing particular embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, "sharding distribution streams" means, for a plurality of distributions or payments from a plurality of transactions, allocating each distribution unapportioned to a respective recipient. In contrast, "Sharding distributions" means apportioning each distribution or payment from a transaction among a plurality of recipients.

The terms "recipient," "payee," and "stakeholder" are used interchangeably herein and both refer to the person or entity entitled to receive a portion of a distribution such as an electronic payment. Preferably a recipient is a creator of a creative work. However, it can be appreciated that for many different reasons, the entitlement to receive the portion of the distribution can be transferred to another person or entity prior to issuance of a smart contract embodying principles disclosed herein.

Figure 2:
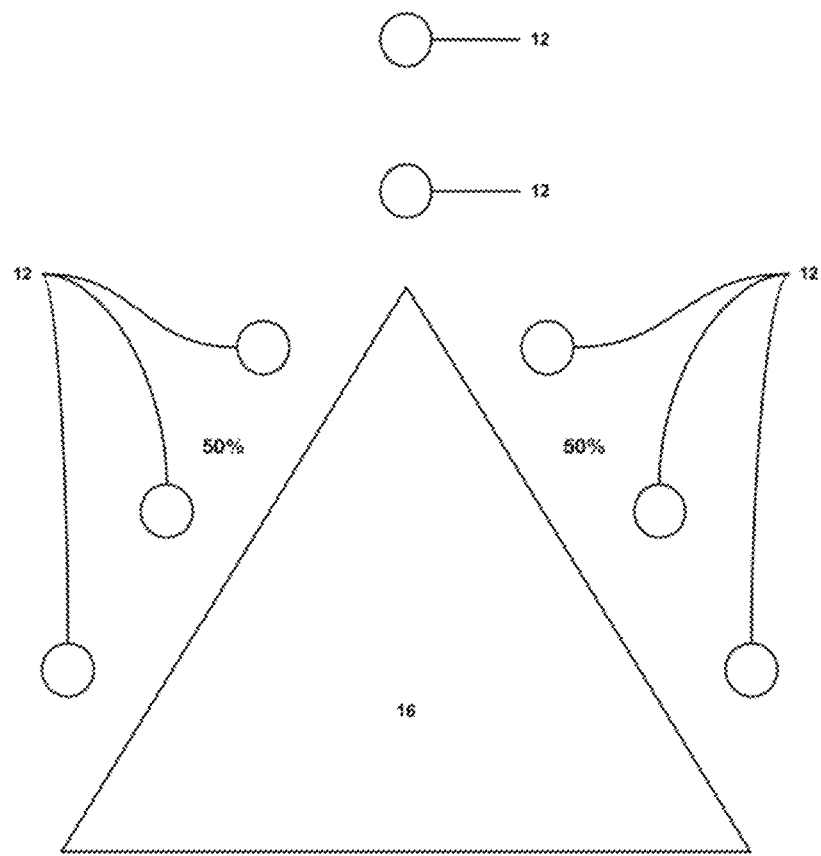
FIG. 2 illustrates a sharding distribution streams scheme.

FIGS. 1 and 2 illustrate the difference between sharding distributions 10 from different transactions and sharding distribution streams 12 from the transactions. Since each transaction distribution is separately streamed, each illustrated distribution 10 and each distribution 12 can be considered a distribution stream.

FIG. 1, illustrates sharding distributions 10 where each distribution or payment 10 is equally apportioned between a plurality of recipients (in this case 2) by a sharding or splitting protocol or algorithm 14. The algorithm 14 splits each distribution into two halves 10a and 10b with halves 10a transmitted to storage for a first recipient and halves 10b transmitted to another storage for a second recipient. This sharing scheme requires an immense amount of energy, and hence cost, as explained below. This is particularly true for microtransactions and micropayments of the type present in high volume, low royalty situations such as music and video streaming.

In contrast, FIG. 2 illustrates sharding distribution streams wherein distributions or payments 12 are directed unapportioned equally between the two recipients by a different splitting protocol or algorithm 16. As can be appreciated, over time, with a sufficiently large number of distributions 12, each recipient will effectively receive an equal share of all of the distributions 12.

The Ethereum® network allows applications such as smart contracts to run on its blockchain, giving an ETH transaction fee an added type of utility. Because ETH fees power applications that run on Ethereum®, these fees are usually referred to as "Gas." On Ethereum®, the term "Gas" is used to describe a unit of measurement for the amount of computational power needed for executing specific operations on the network. Because every Ethereum® transaction consumes computational resources, transactions come with a cost. Gas is the fee needed to conduct an Ethereum® transaction. Thus sending ETH from one Ethereum® wallet to another requires fees.

Ethereum® fees can only be paid in ETH. ETH Gas prices may be denominated in a unit known as Gwei, which is a term used to refer to an amount of ETH equal to 0.000000001 ETH.

A typical royalty distribution scheme in which royalty funds are distributed on the Ethereum® blockchain using the protocol of FIG. 1 involves:

1. a smart contract that receives an amount of Ether (ETH, the native asset or currency on the Ethereum® blockchain);
2. the smart contract having N stakeholders (recipients), each with a known percentage stake or share;
3. the smart contract iterating over the N stakeholders and transferring to, or increasing a balance of, each stakeholder the Ether in proportion to their stake.

Smart contracts are well known. A smart contract is a computer program or a transaction protocol which is intended to automatically execute, control or document relevant events and actions according to the terms of a contract or an agreement. Essentially, a smart contract is a digital version of essential terms of a standard paper contract that automatically verifies fulfillment and enforces and performs the terms of the contract. However, it is not a legally binding agreement.

A smart contract is executed through a blockchain network, and the code of the contract is replicated on many computers that comprise the network.

Similar to a transfer of value on a blockchain, deployment of a smart contract on a blockchain occurs by compiling both the smart contract code and the underlying work into combined information and then distributing the combined information via one or more networks. The combined information also includes a special receiver address. That transaction must then be included in a block that is added to the blockchain, at which point the smart contract's code will execute to establish the initial state of the smart contract. Once a smart contract is deployed, it cannot be updated. Smart contracts on a blockchain can store arbitrary states and execute arbitrary computations. End clients, e.g., consumers, interact with a smart contract through transactions. These transactions might result in changing the state and sending a payment from one smart contract to another smart contract or from one electronic account to another electronic account.

A popular, if not the most popular, blockchain for running smart contracts is Ethereum®. On Ethereum®, smart contracts are typically written in a Turing-complete programming language called Solidity®, and compiled into low-level bytecode to be executed by the Ethereum® Virtual Machine. Due to the halting problem and other security problems, Turing-completeness is considered to be a risk and is deliberately avoided by languages like Vyper. Some of the other smart contract programming languages missing Turing-completeness are Simplicity, Scilla, Ivy, and Bitcoin Script.

In the typical royalty distribution scheme mentioned above, the overall Gas $G_N$ to complete a transaction in the worst case is:

$$G_N >= G_{transaction} + [N*(G_{coldaccountaccess} + G_{high} + G_{callvalue})]$$

In the case where:
- $G_{transaction}$, the amount paid per transaction set by Ethereum®=21000 Gas;
- $G_{coldaccountaccess}$, the cost of a cold account access set by Ethereum®=2600 Gas;
- $G_{high}$, the amount to pay for operations for the set $W_{high}$ set by Ethereum®=10 Gas; and
- $G_{callvalue}$, the amount paid for a non-zero value transfer as part of the Call operation set by Ethereum®=9000 Gas, the calculation in Gas resolves to:

$$G_N >= 21000 + [N*(2600+10+9000)]$$

Thus, various calculations for different numbers of stakeholders can be made to highlight the high cost for this royalty distribution scheme. Table 1 below provides results for N at different orders of magnitude of 1, 10, 100, and 1000.

TABLE 1

| N | 1 | 10 | 100 | 1000 |
|---|---|---|---|---|
| $G_N$ in Gas | 32610 | 137100 | 1182000 | 11631000 |
| Gas Price in Gwei | 70 | 70 | 70 | 70 |
| Cost in Gwei | 2282700 | 9597000 | 82740000 | 814170000 |
| Cost in U.S. $ on Ethereum ® | $ 6.745 | $ 28.35 | $ 244.49 | $ 2405.87 |
| Cost in U.S. $ on Polygon ® | $ 0.003 | $ 0.0148 | $ 0.128 | $ 1.26 |

Example conversion calculations to U.S. $ above, and throughout this disclosure, use market prices of $2955 per ETH (Ethereum native token) and $1.55 per MATIC (Polygon native token), respectively. Since market prices fluctuate, these figures are for relative comparisons across varying values of N. The absolute values of these prices do not impact the nature of the disclosed invention.

As shown in Table 1, on Ethereum® the fees (as better understood using the conversion to dollars as of the time of this writing) to do royalty pushes are very high when one considers that the amount paid on the royalty could be less than U.S. $1.00. the payor would need to pay approximately a minimum of 6 times the cost just to send U.S. $1.00 to the stakeholders. Using an alternative blockchain, such as Polygon® (an Ethereum® virtual machine (EVM) compatible side chain), improves this, but even in the case where the number of stakes N=10, if the price per access is 2 cents, there's a 50% cost markup to the consumer in Gas fees to distribute the payment, i.e., move the money. Polygon® (previously Matic Network) is a protocol and a framework for building and connecting Ethereum-compatible blockchain networks.

However, in accordance with principles disclosed herein, by sharding distribution streams rather than sharding distributions, the costs to distribute can be significantly reduced, and, as the number of distribution streams approaches a very large number, the distributions can be allocated fairly and in accordance with the recipients' shares. Disclosed herein are three main distribution systems and methods which are generically referred to as step sharding. More specifically they can be referred to as: linear rotational or spin sharding using a linearly populated address array; linear rotational or spin sharding using a randomly populated address array; and random walk sharding.

I. Linear Rotational or Spin Sharding Using a Linearly Populated Address Array

In accordance with principles disclosed herein, if a linear rotational or spin sharding protocol, such as illustrated in FIG. 2, is used, the overall Gas $G_N$ in the worst case is:

$$G_N >= G_{transaction} + [M*(G_{coldaccountaccess} + G_{high} + G_{callvalue})]$$

Where M always is 1, because the royalty is not split into N shares or stakes. In accordance with the principles disclosed herein, on each transaction an index of the recipients or payees ($P_i$) awarded the full royalty increments until $P_i=(M-1)$, then $P_i$ is reset to 0. As the number of transactions (T) approaches infinity, the delta or difference between the accrued revenue and the owed revenue of each stakeholder approaches 0.

The results for the calculation of the overall cost $G_N$ in this situations are shown in Table 2, below.

TABLE 2

| N | 1 | 10 | 100 | 1000 |
|---|---|---|---|---|
| $G_N$ in Gas | 32610 | 32610 | 32610 | 32610 |
| Gas Price | 70Gwei | 70Gwei | 70Gwei | 70Gwei |
| Cost in Gwei | 2282700 | 2282700 | 2282700 | 2282700 |
| Cost in U.S. $ on Ethereum ® | $ 6.745 | $ 6.745 | $ 6.745 | $ 6.745 |
| Cost in U.S. $ on Polygon | $ 0.0035 | $ 0.0035 | $ 0.0035 | $ 0.0035 |

Below is sample smart contract code for implementing a linear rotational or spin sharding method for sharding distribution streams using a linearly populated address array. Sample Smart Contract Code (written in Solidity):

```
pragma solidity >=0.8.0 <0.9.0;
import "./libraries/Immutable.sol";
import "./LimitedOwnable.sol";
contract S2RD is LimitedOwnable {
    event Payment(
        address indexed from,
```

-continued

```
    address indexed recipient,
    uint256 indexed addressIndex,
    uint256 value
);
uint256 public constant MAX_SPLIT_COUNT = 200;
Immutable.AddressArray private __addresses;
uint256 private __currentAddressIndex = 0;
constructor( )
    public
    LimitedOwnable(
        true, /* WALLET */
        false, /* SPLIT */
        false, /* PFA_UNIT */
        false /* PFA_COLLECTION */
    )
{ }
function initialize(
    address[ ] memory addresses__,
    address shareContractAddress__
) public onlyOwner {
    require(addresses__.length < MAX_SPLIT_COUNT,
        "SHARE006");
    require(addresses__.length >=1, "SHARE020");
    setShareContractAddress(shareContractAddress__);
    SHARE protocol = SHARE(shareContractAddress__);
    for (uint256 i = 0; i < addresses__.length; i++) {
        require(
            protocol.isApprovedBuild(
                addresses__[i],
                CodeVerification.BuildType.WALLET
            ),
            "SHARE007"
        );
        Immutable.pushAddress(__addresses, addresses__[i]);
    }
    __addresses.locked = true;
    setInitialized( );
}
function addressIndex( ) public view afterInit returns (uint256) {
    return __currentAddressIndex;
}
receive( ) external payable nonReentrant afterInit {
    address recipient = __addresses.value[__currentAddressIndex];
    emit Payment(msg.sender, recipient, __currentAddressIndex,
        msg.value);
    if (__currentAddressIndex < (__addresses.value.length - 1)) {
        __currentAddressIndex++;
    } else {
        __currentAddressIndex = 0;
    }
    payable(recipient).transfer(msg.value); // max 2300 gas
}
}
```

In this code, each time a new distribution is pushed, a pointer to addresses or address slots in the address array is incremented. When the pointer reaches the last address populating the address array, the pointer reverts to pointing to the first address in the address array. Of course, the pointer values could be decremented instead without departing from the principles disclosed herein. The idea is to step linearly through the addresses populating the address array, so that the address array effectively serves as a ring memory. As can be appreciated, the characterization of the sharding method as a rotational or spin sharding method is appropriate because of the way the pointer cycles through the addresses in the address array.

Setup/Construction Cost

In the code above, the initialization logic prepares a virtually contiguous block of N 160-bit addresses, where N<=100/minimum number of percentage points any recipient may have in the creative work. Considering this minimum share number to be 0.5 percentage points, then N<=200 addresses.

Setup (i.e., construction) requires supplying the smart contract with the list of recipient/stakeholder addresses, and then populating an address array with the addresses. One way to do this is to layout the address array off-blockchain based on the splits, and then to pass this address array to the contract at construction time.

As a simple example, given two recipients, recipient A with a 75% share and recipient B with a 25% share, the address array slots would be populated as shown in Table 3:

TABLE 3

| Address slot 0: | wallet address of recipient A (0.25) |
| Address slot 1: | wallet address of recipient A (0.25) |
| Address slot 2: | wallet address of recipient A (0.25) |
| Address slot 3: | wallet address of recipient B (0.25) |

In this example, if the address pointer increments starting with address array slot 0, recipient B must always wait for at least 3 payments to recipient A to occur before recipient B receives a payment. Conversely, if the pointer decrements starting with address array slot 3, recipient B will receive a payment before recipient A receives a payment. Again, since the goal is to continually cycle through the address array slots, and hence the addresses of the recipients, this can be thought of as a rotational or spin sharding of distribution streams.

The setup cost is then equal to the cost to copy the array of values from a stack into contract storage. At 160-bits per address and 200 address values, this is approximately 4 KB of data (which equals 125 words of data, given the Ethereum VM is a stack-based, big-endian VM with a word size of 256-bits), and the cost of a copy operation is 3 Gas*number of words of data.

Therefore, the setup cost $G_{setup}$ in Gas is at a minimum:
$G_{setup} = G_{txcreate} + G_{transaction} + 125 * G_{copy}$
$G_{setup} = 32000 + 21000 + 375$
$G_{setup} = 53375$ where:
$G_{txcreate}$, the amount paid by all contract-creating transactions after the Homestead transition set by Ethereum®=3200 Gas;
$G_{transaction}$, the amount paid for every transaction set by Ethereum®=21000 Gas; and
$G_{copy}$, the amount paid per word for COPY operations set by Ethereum®=3 Gas.

If the price of Gas, $Price_{gas}$ is 70 Gwei, then:
$Cost_{setup} = G_{setup} * Price_{gas}$
$Cost_{setup} = 53375 * 70$ GWei
$Cost_{setup} = 3736250$ Gwei
$Cost_{setup} = 0.00373$ (ETH|MATIC)

In Table 4, below, $Cost_{setup}$ is converted to dollars for both the Ethereum® and Polygon® systems.

TABLE 4

| Ethereum ® Setup Cost (Gas price 70Gwei) | Polygon ® Setup Cost (Gas price 70Gwei) |
|---|---|
| U.S. $11.00 | U.S. $0.006 |

Savings

Considering an asset with N streams of distributions (e.g., royalties) and M recipients or payees (e.g., creators or collaborators or their assignees), to push splits in a non-rotational setup, it costs the dealer (e.g. a consumer such as a listener that initiates the push transaction) $M*G_{PUSH}$+ Access Price, where $G_{PUSH}$ is the amount equal to the gas units associated with the amount of code in the smart contract*the price of gas on the Ethereum network The lifetime amount of Gas paid to do revenue splits=$N*M*G_{PUSH}$, where each listen costs the listener $M*G_{PUSH}$.

With rotational sharding, to push splits in this setup it costs the pusher (e.g., the consumer) $1*G_{push}$+Access Price. The lifetime amount of Gas paid to do revenue splits then is equal to $N*G_{push}$, where each use of the work (for example, listen of a song) costs the dealer $G_{push}$. The tradeoff here is small, e.g. the payee or whoever creates the smart contract pays the additional contract setup cost $Cost_{setup}$ of 3736250 Gwei and the additional index increment cost (single integer EVM operation Gas).

The lifetime savings are proportional to the number of splits, e.g. savings=MX. Thus, e.g., for 50 collaborators, rotational sharding is 50× less expensive for the consumer.

Measuring the time to receive payments and dealing with edge cases

One of ordinary skill in the art may appreciate that in certain situations linear rotational sharding may produce less than optimal results. To better understand this, consider an address array populated as set forth in Example 1 below.

Example 1 (Linear Recipient/Stakeholder Address Initialization)

| |
|---|
| stakeholder A (0.25) |
| stakeholder A (0.25) |
| stakeholder A (0.25) |
| stakeholder B (0.25) |

Note that the number of slots in the address array or ring memory is determined by first finding each greatest common divisor (GCD) of a given stakeholder percentage and the number 100 (i.e. 100%). Once all GCD(percentage$_{stakeholder}$, 100) values are computed, the number of slots is equal to 100 divided by the minimum GCD value. Above, the GCD(percentage$_{stakeholder}$, 100) for all stakeholders is 25. The minimum GCD([25], 100) is also 25, therefore the number of slots is equal to 100/25=4.

In the example above stakeholder A owns a 75% revenue share, while stakeholder B owns a 25% revenue share. Stakeholder B must always wait for at least 3 payments to occur before they receive a revenue share.

If a work, e.g. a song, has M collaborators and each collaborator is a recipient or stakeholder, each collaborator is guaranteed to be debt settled by each M number of streams. Since the maximum M is set to 200, this means that all stakeholders will achieve parity by, at the most, every 200 transactions, which in the case of streaming music would be 200 streams of a song. If the number of streams is not divisible by M, then there exists a time period where a debt is owed to recipients whose addresses may fall within a band of the address range that has not yet been reached by the pointer. That said, the debt is capped at the price per stream, e.g. streaming revenue cannot accumulate such that a single recipient is ever owed more than the price of a single stream at any given time. This is because in order for revenue to again accumulate for the addresses that have already been paid a payment must be made for the currently unpaid recipient P before the pointer will reach the index of a previously paid payee's address.

If the number of streams never exceeds the number of recipients, e.g. a song with 100 owners only garners 10 lifetime streams, then it is possible for a revenue debt to never be settled. This means that 10 stakeholders will receive revenue, and 90 will not. That said, the revenue that they each received is only the revenue of a single stream.

This is a little more complicated in the following case.

Consider two recipients, and a ring memory with 100 slots, where recipient A has 90 percentage points and recipient B has 10 percentage points. In this case if the asset yields 10 lifetime streams or distributions, recipient A receives price*10, while recipient B receives 0 (e.g. recipient B's address is never reached by the pointer). This is the case until the number of streams reaches 90.

One way to describe this is that payments are prioritized by revenue share, e.g. higher shareholders receive revenues first. Again this is limited based on the number of address array address slots (which is 200 in the disclosed embodiment). In the worst case, recipient A's address is populated in 199 slots and recipient B's address is populated in 1 slot, the maximum amount of revenue paid to the priority recipient is 199*the price per use set in the smart contract, while recipient B waits for payment. This should not be ignored due to the fact that the price per use may be creator controlled, not protocol controlled. This means, e.g., that the following scenario is possible:

price per stream=$1,000
address slots=200
recipient A is associated with 199 slots
recipient B is associated with 1 slot
total number of streams/distributions=199

This is a significant problem. Recipient A will receive $199,000 before recipient B receives any payment, even though recipient B is entitled to 0.5% of the revenue (in this example, $995).

II. Linear Rotational or Spin Sharding Using Randomly Populated Address Array

A potential solution to this timing of payment problem is to use a Normal or Gaussian distribution when populating the address array rather than populating linearly with repeated stakeholder addresses. This can also be done off-chain prior to initializing the smart contract.

Consider Example 2 below.

Example 2 (Random Recipient Address Initialization)

| |
|---|
| stakeholder A (0.25) |
| stakeholder B (0.25) |
| stakeholder A (0.25) |
| stakeholder A (0.25) |

In Example 2, the slot order is randomly selected, increasing the fair sharing (e.g. order of payments) among collaborators. The probability that B will be the last to receive payment is 1 in (4*3*2*1) (4%) vs. 100% in example 1.

However, a note on probability here. If four (4) slots 0, 1, 2, and 3 are populated with values A, B, C, and D, then the probability of selecting any slot at random is 25%, e.g. there's a 1 in 4 chance of selecting the slot with the value C. However, the probability that a given value, for example C, is in a specific slot (e.g. slot 3) is 1 in the total number of possible slot permutations (e.g. 4 possible values in slot 0*3 remaining possible values in slot 1*2 remaining possible values in slot 2*1 remaining possible value in slot 3). It should be noted that as the number of streams approaches infinity the distinction between these two models becomes negligible since the pointer will have cycled a near infinite number of times.

Thus, alternatively, a random number generator can be used to randomly initialize the addresses, i.e., randomly populate the addresses in the address array. Below is off-blockchain smart contract construction code which prepares the address array which will be stored in a smart contract.

Sample Smart Contract Construction Code (written in Javascript):

```javascript
function gcd(a, b) {
  if (a == 0) return b;
  while (b != 0) {
    if (a > b) a = a - b;
    else b = b - a;
  }
  return a;
}
export function populateS2RDAddressTable(rawAddressTable) {
  console.log("Executing S2RD initialization algorithm...");
  // Find maximum percentage
  let sortedAddressTable = [...rawAddressTable].sort((el1, el2) => {
    return el1.percentagePoints >= el2.percentagePoints;
  });
  console.log(sortedAddressTable);
  // Find GCD(100, max)
  // Iterate and find GCD(prev_gcd, next_largest) until we know
  // the greatest common divisor of all split percentages
  let minGCD = 100;
  sortedAddressTable.forEach((element) => {
    console.log(element);
    minGCD = gcd(minGCD, element.percentagePoints);
  });
  console.log('min GCD: ${minGCD}');
  // This number must be >= 0.5
  if (minGCD < 0.5) {
    throw new Error(
      "populateS2RDAddressTable received rawAddresssTable with a percentage less than 0.5%"
    );
  }
  // Number of slots = 100/GCD
  const totalSlotCount = 100 / minGCD;
  console.log('total slot count: ${totalSlotCount}');
  // Create an array of size(# slots) and initialize with nulls
  let addressSlotArray = new Array(totalSlotCount);
  for (let i = 0; i < addressSlotArray.length; i++) {
    addressSlotArray[i] = null;
  }
  console.log(addressSlotArray);
  // Iterate over raw address table
  sortedAddressTable.forEach((element) => {
    // For each address, the number of slots = percentage * total slots
    // This is guaranteed to be an integer because total slots is
    // (100 / GCD) where percentage must be divisible by GCD
    const numSlotsForAddress =
      (element.percentagePoints * totalSlotCount) / 100.0;
    if (!Number.isInteger(numSlotsForAddress)) {
      throw new Error("numSlotsForAddress is not an integer");
    }
    console.log(
      'slots for address ${element.address}: ${numSlots ForAddress}'
    );
    let counter = 0;
    while (counter < numSlotsForAddress) {
      // Pick a random slot, if the slot is null, insert the address
      const randomSlot = Math.floor(Math.random( ) * totalSlotCount);
      // console.log('random slot: ${randomSlot}');
      if (addressSlotArray[randomSlot] === null) {
        // and increment the counter. If the slot is not null, pick another
        // slot and do not increment the counter.
        addressSlotArray[randomSlot] = element.address;
        counter++;
      }
    }
    // Once the counter reaches slot quota, move to the next address
  });
  // Once this is done for all addresses the non-linear layout is
  // done
  return addressSlotArray;
}
```

In this code, after the number of address array slots is calculated based on the number of recipients and their shares, and address array "addressSlotArray" is randomly populated with the recipient's addresses using a random number generator, which in this example is "math.random( )"

III. Random Step Sharding

In yet another alternative, a random number generator, e.g., the Javascript function "math.random ( ) can be used to generate a random number between 0 and 1, and the results can be used to generate random values for the address slot pointer. A smart contract can access this off-blockchain function to set the pointer value. In this way, each payment can be randomly allocated among the recipients whose addresses populate the address array slots. Over time, as the number of payments reaches a sufficiently large number, the number of times each recipient receives the full payment evens out among the recipients so that each recipient receives or effectively receives their allocated share of all of the payments.

IV. Cost Savings

The cost saving provided by the sharding methods disclosed herein can be considerable. Consider the examples discussed below.

Examples of cost margins

In these examples, creators charge a price P (price-for-access) and the network charges a Gas fee G to complete the transaction. The total cost that the consumer pays per access is C=P+G.

Without rotational sharding:

Assuming, e.g., P=$0.05, then:

$$G >= G_{transaction}[N*(G_{coldaccountaccess} \; G_{high} \; G_{callvalue})]$$

TABLE 5

| N | 1 | 10 | 100 | 1000 |
|---|---|---|---|---|
| $G_N$ | 32610 | 137100 | 1182000 | 11631000 |
| Gas Price in Gwei | 70Gwei | 70Gwei | 70Gwei | 70Gwei |
| Gas Cost Gwei | 2282700 | 9597000 | 82740000 | 814170000 |
| Gas Cost in U.S. $ on Ethereum ® | $ 6.745 | $ 28.35 | $ 244.49 | $ 2405.87 |
| Gas Cost in U.S. $ on Polygon ® | $ 0.003 | $ 0.0148 | $ 0.128 | $ 1.26 |
| $C_{without}$ (Total cost on Polygon ®) | $ 0.053 | $ 0.0648 | $ 0.178 | $ 1.31 | and $$C_{without}=P+G_{transaction}+[N*(G_{coldaccountaccess}+G_{high}+G_{callvalue})]$$

With rotational sharding:
P=$0.05 (for example)

$$G>=G_{transaction}+[1*(G_{coldaccountaccess}+G_{high}+G_{callvalue})]$$

$$C_{with}=P+G_{transaction}+[1*(G_{coldaccountaccess}+G_{high}+G_{callvalue})]$$

TABLE 6

| N | 1 | 10 | 100 | 1000 |
|---|---|---|---|---|
| $G_N$ | 32610 | 32610 | 32610 | 32610 |
| Gas Price | 70Gwei | 70Gwei | 70Gwei | 70Gwei |
| Gas cost GWei | 2282700 | 2282700 | 2282700 | 2282700 |
| Gas cost U.S. $ on Ethereum ® | $ 6.745 | $ 6.745 | $ 6.745 | $ 6.745 |
| Gas cost U.S. $ on Polygon ® | $ 0.003 | $ 0.003 | $ 0.003 | 0.003 |
| $C_{with}$ (Polygon ®) | $ 0.053 | $ 0.053 | $ 0.053 | 0.053 |

TABLE 7

| P | $ .05 | $ .05 | $ .05 | $ .05 |
|---|---|---|---|---|
| N | 1 | 10 | 100 | 1000 |
| $C_{without}$ (Polygon) | $0.053 | $ 0.0648 | $ 0.178 | $ 1.31 |
| $C_{with}$ (Polygon) | $0.053 | $ 0.053 | $ 0.053 | $ 0.053 |
| Gas cost markup to the end user (without spin) | 6% | 29.5% | 256% | 2520% |
| Gas cost markup to the end user (with spin) | 6% | 6% | 6% | 6% |

On a $0.05 transaction, without rotational sharding, with 10 collaborators the consumer pays 1.3 times the price of experience (e.g. creator specified price plus an additional 30% to split the revenue among collaborators). With 100 collaborators, the consumer pays 3.56 times the price of experience (e.g. creator specified price plus an additional 256% to do the split). The price to distribute the revenues among collaborators scales linearly, or is O(n) where n is the number of collaborator With rotational sharding, the consumer pays 1.06 times the price of experience+(e.g. creator specified price plus an additional 6% to split the revenue among collaborators) independent of the number of collaborators. Thus, in accordance with the principles disclosed herein, the price to distribute the revenues among collaborators is constant and independent of the number of collaborators. It is O(1).

Figure 3:
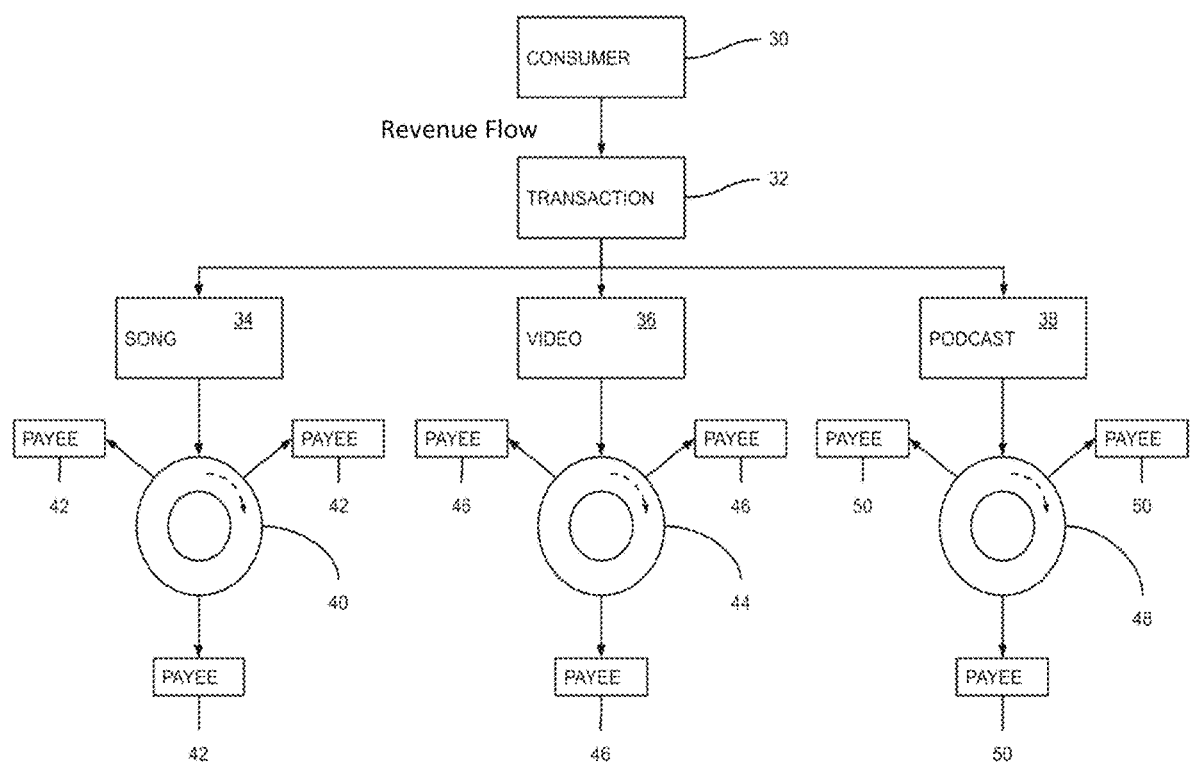
FIG. 3 illustrates a typical network on which the principles disclosed herein can be implemented.

FIG. 3 illustrates a typical network arrangement according to principles disclosed herein. In this arrangement, a consumer 30 transacts to experience some content. The consumer 30 can be an application on a consumer device. For that purpose, the consumer 30 interacts with a transaction application 32 which receives a payment from the consumer 30. Such transaction applications are known and incorporate the payment terms and policies for experiencing a given unit of electronic content. The transaction application 32 interacts with one or more other server applications which control access to the content. The server applications interact with the transaction application 32 and determine that the payment was made and then proceed to retrieve and serve the content to the consumer 30. In FIG. 3, there are separate server applications 34, 36, and 38. Server application 34 is associated with a particular song. Server application 36 is associated with a particular video. Server application 38 is associated with a particular podcast. Other types of content (e.g. only, ebooks, emagizines, news articles, etc.) can also be consumed in this way. Additionally, the same server application can be associated with any number of units of content, FIG. 3 is merely one example.

As also illustrated, the payment or distribution received by the transaction application 32 is passed on, via the corresponding server application, to a respective smart contract 40, 44, or 48 which effects the distribution stream sharding method disclosed herein. Smart contract 40, associated with song content 34, shards the distribution streams for the song content 34 among payees 42, which are three in number. Smart contract 44, associated with video content 36, shards the distribution streams for the video content 36 among payees 46, which are three in number. Smart contract 48, associated with podcast content 38, shards the distribution streams for the podcast content 38 among payees 50, which are three in number.

As can be appreciated, the number of payees can vary among the different smart contracts. Also, the smart contracts send the distributions directly to the electronic wallets of the payees, so the payees 42, 46, and 50 represent both the payees and their electronic wallets.

As can also be appreciated, all of the foregoing takes place via known computer networks which include processors and non-transitory computer readable storage media such as described above.

Figure 4:
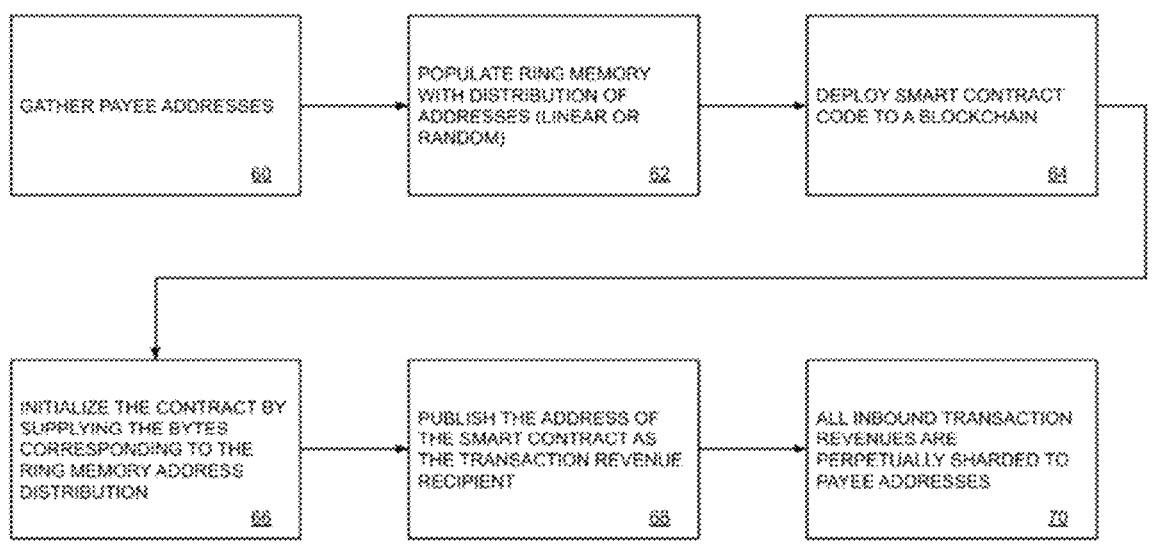
FIG. 4 illustrates the process of creation, distribution, and use of a smart contract embodying principles disclosed herein.

FIG. 4 illustrates the process for the creation, distribution, and use of a smart contract embodying principles disclosed herein. In step 60, the addresses of the electronic wallets of the payees associated with a particular unit of content are collected as well as each payees share interest in the distributions. In step 62, the ring memory or address array is populated with the addresses using one of methods described above. In step 64, the smart contract code, such as that described above, is deployed to a blockchain. In step 66, the smart contract is initialized by supplying the bytes corresponding to the address array/ring memory addresses. In step 68, the address of the smart contract is published as the transaction revenue or payment recipient. In step 70, the smart contract shards the incoming distributions or payments to the payee addresses, theoretically in perpetuity.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A non-transitory storage medium of a blockchain based decentralized distribution network with blockchain virtual machine executable instructions of a smart contract stored thereon that when executed by a blockchain virtual machine cause the smart contract to:

receive, via the decentralized distribution network, an electronic payment of a stream of payments;

automatically select, in accordance with the instructions of the smart contract, a location from within a probabilistically encoded address array from which to retrieve a selected payee's address, the address array electronically storing a plurality of electronic addresses of different payees in a plurality of locations in the address array, each different payee being entitled to a respective share of the payment, each payee's electronic address being populated in the address array redundantly and at a frequency proportional to the payee's respective share of the stream of payments, the address array being populated as a pre-initialization step prior to deployment onto a blockchain decentralized distribution network; and automatically retrieve the selected payee's electronic address from the selected location in the address array and transmit, in accordance with the instructions of the smart contract, the payment in its entirety to the electronic address of the selected payee, wherein, the location of the selected payee's electronic address in the address array is different from an immediately preceding location in the address array selected in an immediately preceding processing of an immediately preceding electronic payment, and transmissions of payments to the payees over time occur at a blockchain computational work amount that is commensurate with a constant number of computational instructions per payment and does not scale linearly or super-linearly with the number of payees.

2. A computer implemented method, comprising:

executing instructions of a smart contract using a virtual machine on a blockchain decentralized distribution network:

receiving, by the virtual machine, an electronic stream of payments via the decentralized distribution network, the smart contract residing on the decentralized distribution network and causing the virtual machine to automatically execute actions according to terms of the smart contract;

per the smart contract instructions, automatically selecting by the virtual machine a location from within a probabilistically encoded address array with a selected payee's address, the address array readable by the virtual machine and storing a plurality of addresses of different payees in a plurality of locations in the address array, each different payee being entitled to a respective share of the payment, each payee's electronic address being populated in the address array redundantly and at a frequency proportional to the payee's respective share of the stream of payments, the address array being populated prior to deployment onto the blockchain decentralized distribution network; and per the smart contract instructions, automatically retrieving the selected payee's address from the selected location in the address array and transmitting, by the virtual machine, the payment in its entirety to an electronic account of the selected payee via the selected payee's address, wherein, the location of the selected payee's address in the address array is different from an immediately preceding location in the address array selected in an immediately preceding processing of an in immediately preceding electronic payment, and transmissions of payments to the payees over time occur at a blockchain computational work amount that is commensurate with a constant number of computational instructions per payment and does not scale linearly or super-linearly with the number of payees.

3. The computer implemented method of claim 2, wherein, the address array is encoded with the payee addresses using a non-blockchain computer system by (a) denoting a numerical value corresponding to 100 percent of ownership shares in a revenue generating property (b) denoting a greatest-common-divisor (GCD) of the numerical value corresponding to 100 percent of ownership shares for a set of payee ownership shares each of which is expressed as an ownership share number (c) computing a total number of slots by dividing the numerical value corresponding to 100 percent of ownership shares by the GCD, (d) constructing a vector of equal size, and (e) for each payee address, the payee address is inserted into the vector at a frequency that is equal to the ownership share number for the respective payee ownership share divided by the GCD.

4. The computer implemented method of claim 2, wherein, the address array is encoded with the payee addresses using a non-blockchain computer system by (a) denoting a numerical value corresponding to 100 percent of ownership shares in a revenue generating property (b) denoting a greatest-common-divisor (GCD) of the numerical value corresponding to 100 percent of ownership shares for a set of payee ownership shares each of which is expressed as an ownership share number (c) computing a total number of slots by dividing the numerical value corresponding to 100 percent of ownership shares by the GCD, (d) constructing a vector of equal size, and (e) for each payee address, the payee address is inserted into the vector at a frequency that is equal to the ownership share number for the respective payee ownership share divided by the GCD.

5. A computer implemented method comprising:

on a non-blockchain computer system, populating an address array as a probabilistic distribution with electronic account addresses of a plurality of payees, each different payee being entitled to a respective share of the payment, each payee's electronic account address being populated in the address array at a frequency proportional to the payee's respective share of a stream of payments; and on a blockchain based computer system, deploying a smart contract with blockchain virtual machine executable instructions that when executed by a blockchain virtual machine, cause the blockchain virtual machine to:

receive an electronic payment of the stream of payments;

automatically select, in accordance with the instructions of the smart contract, a location in an address array from which to retrieve a selected payee's electronic account address; and automatically retrieve the selected payee's address from the selected location in the address array and transmit, in accordance with the instructions of the smart contract, the payment in its entirety to an electronic account of the selected payee via the selected payee's address, wherein,
the location of the selected payee's address in the address array is different from an immediately preceding location in the address array selected in an immediately preceding processing of an in immediately preceding electronic payment, and transmissions of payments to the payees over time occur at a blockchain computational work amount that is commensurate with a constant number of computational instructions per payment and does not scale linearly or super-linearly depending on the number of payees.

6. The computer implemented method of claim 5, wherein selecting the selected payee's address comprises setting a value in a pointer, the value indicating from which location in the address array to retrieve the selected payee's address.

7. The computer implemented method of claim 6, wherein setting the value in the pointer comprises incrementing or decrementing a value already present in the pointer and thus selecting an address adjacent the address indicated by the value already present in the pointer.

8. The computer implemented method of claim 6, wherein setting the value in the pointer comprises iterating over a list of addresses where each address occupies a randomly populated position within the list.

9. The computer implemented method of claim 5, wherein using the non-blockchain computer system, encoding the address array of payee addresses by (a) denoting a numerical value corresponding to 100 percent of ownership shares in a revenue generating property (b) denoting a greatest-common-divisor (GCD) of the numerical value corresponding to 100 percent of ownership shares for a set of payee ownership shares each of which is expressed as an ownership share number (c) computing a total number of slots by dividing the numerical value corresponding to 100 percent of ownership shares by the GCD, (d) constructing a vector of equal size, and (e) for each payee address, the payee address is inserted into the vector at a frequency that is equal to the ownership share number for the respective payee ownership share divided by the GCD.

10. The computer implemented method of claim 5, wherein using the non-blockchain computer system, encoding the address array of payee addresses by (a) denoting a numerical value corresponding to 100 percent of ownership shares in a revenue generating property (b) denoting a greatest-common-divisor (GCD) of the numerical value corresponding to 100 percent of ownership shares for a set of payee ownership shares each of which is expressed as an ownership share number (c) computing a total number of slots by dividing the numerical value corresponding to 100 percent of ownership shares by the GCD, (d) constructing a vector of equal size, and (e) for each payee address, the payee address is inserted into the vector at a frequency that is equal to the ownership share number for the respective payee ownership share divided by the GCD.

11. The computer implemented method of claim 5, wherein the address array with the addresses of the different payees is populated using a linear distribution.

12. The computer implemented method of claim 5, wherein the address array with the addresses of the different payees is populated using a random ordering of the addresses.

13. The computer implement method of claim 5, wherein each payee's electronic account address is populated in the address array at a frequency proportional to the payee's respective share of the payment.

14. A computer implemented system for a decentralized information and payments distribution network, comprising:
a vector of electronic addresses of payees each of which is entitled to a share of a stream of payments, the vector being probabilistically and redundantly encoded with the addresses of the payees such that a frequency of the address of each payee within the vector corresponds to an ownership share of the payee of the stream of payments, the vector being populated with the electronic addresses on a non-blockchain based machine supporting random number generation;

a deterministic smart contract program executed on a blockchain virtual machine, the contract being initialized to store the vector in a non-transitory storage medium, the smart contract programmed to (a) route the stream of payments to the payees by routing each payment of the stream of payments to only one of the payees at a time by selecting only one electronic address from the encoded vector, and (b) upon each payment, to increment a pointer value stored in non-transitory storage on a blockchain, up to the index of a final address in the vector, at which time the pointer is reset to repeat such incrementing and resetting in perpetuity, wherein,
over time, transmissions of payments to the payees occur at a blockchain computational work amount that is commensurate with a constant number of computational instructions per payment, and does not scale linearly or super-linearly with the number of the payees, and the vector of payee addresses may be randomly or linearly ordered.

* * * * *